United States Patent
Errickson et al.

(10) Patent No.: US 7,895,462 B2
(45) Date of Patent: Feb. 22, 2011

(54) MANAGING RECOVERY AND CONTROL OF A COMMUNICATIONS LINK VIA OUT-OF-BAND SIGNALING

(75) Inventors: Richard K. Errickson, Poughkeepsie, NY (US); Leonard W. Helmer, Jr., Stone Ridge, NY (US); John S. Houston, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 12/051,631

(22) Filed: Mar. 19, 2008

(65) Prior Publication Data

US 2009/0216927 A1    Aug. 27, 2009

Related U.S. Application Data

(60) Provisional application No. 61/031,315, filed on Feb. 25, 2008.

(51) Int. Cl.
*G06F 11/00* (2006.01)
(52) U.S. Cl. .............................. 714/3; 714/56
(58) Field of Classification Search .................. 714/12, 714/2, 3, 7, 44–46, 56
See application file for complete search history.

(56) References Cited

U.S. PATENT DOCUMENTS

| | | | |
|---|---|---|---|
| 3,643,227 A | 2/1972 | Smith et al. | |
| 5,170,472 A * | 12/1992 | Cwiakala et al. | 710/8 |
| 5,339,413 A | 8/1994 | Koval et al. | |
| 5,343,867 A | 9/1994 | Shankar | |
| 5,388,266 A * | 2/1995 | Frey et al. | 711/163 |
| 5,524,212 A | 6/1996 | Somani et al. | |
| 5,777,987 A | 7/1998 | Adams et al. | |
| 6,073,181 A | 6/2000 | Holland et al. | |
| 6,289,386 B1 | 9/2001 | Vangemert | |
| 6,483,804 B1 | 11/2002 | Muller et al. | |
| 6,507,567 B1 | 1/2003 | Willars | |
| 6,741,552 B1 | 5/2004 | McCrosky et al. | |
| 6,862,609 B2 | 3/2005 | Merkey | |
| 6,993,032 B1 | 1/2006 | Dammann et al. | |
| 7,093,024 B2 | 8/2006 | Craddock et al. | |
| 7,200,704 B2 | 4/2007 | Njoku et al. | |
| 7,283,473 B2 | 10/2007 | Arndt et al. | |
| 7,290,077 B2 | 10/2007 | Gregg et al. | |
| 7,366,813 B2 | 4/2008 | Gregg et al. | |

(Continued)

OTHER PUBLICATIONS

Jeong et al.; A study on TCP Buffer Management Algorithim for Improvement on Network Performance in Grid Environment; Jun. 6-9, 2004 pp. 281-288.

(Continued)

*Primary Examiner*—Dieu-Minh Le
(74) *Attorney, Agent, or Firm*—Cantor Colburn LLP; Steven Chiu (57) ABSTRACT

A computer program product, apparatus and method for managing recovery and control of a communications link via out-of-band signaling. An exemplary embodiment includes sending a command, sending an invalidate request to a buffer associated with the command and receiving a response to the invalidate request at least one of prior to the command reaching the recipient and after the command reaching the recipient.

20 Claims, 8 Drawing Sheets

U.S. PATENT DOCUMENTS

| | | |
|---|---|---|
| 7,467,402 B2 * | 12/2008 | Pennington et al. ............ 726/5 |
| 7,602,774 B1 | 10/2009 | Sundaresan et al. |
| 7,613,183 B1 | 11/2009 | Brewer et al. |
| 2001/0014954 A1 | 8/2001 | Purcell et al. |
| 2001/0030943 A1 | 10/2001 | Gregg et al. |
| 2002/0107903 A1 | 8/2002 | Richter et al. |
| 2002/0194245 A1 | 12/2002 | Simpson et al. |
| 2003/0005039 A1 | 1/2003 | Craddock et al. |
| 2003/0061379 A1 | 3/2003 | Craddock et al. |
| 2004/0123068 A1 | 6/2004 | Hashimoto |
| 2004/0202189 A1 | 10/2004 | Arndt et al. |
| 2004/0221070 A1 | 11/2004 | Ortega, III et al. |
| 2005/0018669 A1 | 1/2005 | Arndt et al. |
| 2005/0060445 A1 | 3/2005 | Beukema et al. |
| 2005/0120237 A1 | 6/2005 | Roux et al. |
| 2005/0144313 A1 | 6/2005 | Arndt et al. |
| 2006/0048214 A1 * | 3/2006 | Pennington et al. ............ 726/5 |
| 2006/0230185 A1 | 10/2006 | Errickson et al. |
| 2006/0230209 A1 | 10/2006 | Gregg et al. |
| 2006/0230219 A1 | 10/2006 | Njoku et al. |
| 2007/0239963 A1 | 10/2007 | Yao et al. |
| 2007/0245050 A1 | 10/2007 | Gregg et al. |
| 2008/0028116 A1 | 1/2008 | Gregg et al. |
| 2008/0109891 A1 * | 5/2008 | Greenwald et al. ............ 726/13 |
| 2008/0196041 A1 | 8/2008 | Gregg et al. |
| 2009/0094603 A1 | 4/2009 | Hiltgen et al. |

OTHER PUBLICATIONS

Huang et al., InfiniBand Support in Xen Virtual Machine Environment, Technical Report, OSU-CISRC-10/05-TR63, Oct. 2005.

"Infiniband Architecture Specification vol. 1", Release 1.0.a, Jun. 19, 2001, pp. 40, 71, 193-194, 366-370, 665-667.

Wu et al., "Design of An InfiniBand Emulator over Myrinet: Challenges, Implementation, and Performance Evaluation", Technical Report, OSU-CISRC-2/01-TR03, 2003.

Non-Final Office Action dated Jun. 23, 2010 for U.S. Appl. No. 12/036,986.

Non-Final Office Action dated Jan. 29, 2010 for U.S. Appl. No. 12/036,979.

Notice of Allowance dated Jun. 23, 2010 for U.S. Appl. No. 12/036,979.

Non-Final Office Action dated Oct. 1, 2010 ffor U.S. Appl. No. 12/037,046.

Non-Final Office Action dated May 17, 2010 for U.S. Appl. No. 12/037,046.

Office Action made Final dated Oct. 6, 2010 for U.S. Appl. No. 12/037,048.

Non-Final Office Action dated Apr. 9, 2010 for U.S. Appl. No. 12/037,048.

Office Action Made Final dated Aug. 12, 2010 for U.S. Appl. No. 12/051,634.

Non-Final Office Action dated Mar. 22, 2010 for U.S. Appl. No. 12/051,634.

Non-Final Office Action dated Jun. 1, 2010 for U.S. Appl. No. 12/051,630.

* cited by examiner

| Message Header | | Buffer Number |
|---|---|---|
| Command | Flags | |
| Sequence Number | WQE Count | |

| Message Header | | Request Type (Off Line Sequence/ Not Operational Sequence) |
|---|---|---|
| Command | Flags | |
| Source | Request ID | |

FIG. 8

MANAGING RECOVERY AND CONTROL OF A COMMUNICATIONS LINK VIA OUT-OF-BAND SIGNALING

Priority based on U.S. Provisional Patent Application, Ser. No. 61/031,315, filed Feb. 25, 2008, and entitled "MULTI-TASKING MULTI-PROCESSOR ENVIRONMENTS OVER INFINIBAND" is claimed, the entire contents of which is incorporated by reference in its entirety.

BACKGROUND OF THE INVENTION

1. Field of Invention

The present disclosure relates generally to multi-tasking multi-processor environments, and in particular, to managing recovery and control of a communications link via out-of-band signaling.

2. Description of Background

When operating a communications link in a multi-tasking multi-processor environment, numerous failures can occur and there are a variety of ways in which the communication link can be recovered. For example, in the existing coupling technologies for a multitasking multi-processor environment, each channel is a separate real hardware connection. In these environments, there is hardware support for handling operations on either the channel or the buffer connection level. Operations of this sort include handling timed out or canceled operations. If there is a problem with the entire channel, then the entire link can be taken through recovery with hardware assists.

In the case of the new coupling technology based upon industry standard Infiniband, multiple channels are emulated across a single physical link, and therefore, there is no hardware assist that can be called upon to aid in the recovery of a failed communication link. Further, the data flow design uses pre-defined sequences of resources made available to send and receive messages across any individual virtual connection. If an unexpected message is received, it causes the connection to go into error. This prevents sending a cancel message on the individual buffer connection. Similar problems exist in the handling of channel operations.

BRIEF SUMMARY OF THE INVENTION

An exemplary embodiment includes a computer program product for managing recovery and control of a communication link in a multi-tasking multi-processor environment, the computer program product including a tangible storage medium readable by a processing circuit and storing instructions for execution by the processing circuit for performing a method including sending a command, sending an invalidate request to a buffer associated with the command and receiving a response to the invalidate request at least one of prior to the command reaching the recipient and after the command reaching the recipient.

Another exemplary embodiment includes an apparatus for managing recovery and control of a communication link in a multi-tasking multi-processor environment, the apparatus including a processor performing a method including sending a command, sending an invalidate request to a buffer associated with the command, receiving a response to the invalidate request, in response to the invalidate request reaching a recipient prior to the command reaching the recipient, receiving a response to the invalidate request in which a sequence number of the invalidate request mismatched a sequence value saved in a data structure and in response to the invalidate request reaching the recipient after the command reaching the recipient, receiving a response to the invalidate request in which the sequence number of the invalidate request matched the sequence value saved in the data structure.

A further exemplary embodiment includes a method for managing recovery and control of a communication link in a multi-tasking multi-processor environment, the method including sending a command, sending an invalidate request to a buffer associated with the command and receiving a response to the invalidate request at least one of prior to the command reaching the recipient and after the command reaching the recipient.

Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In accordance with an aspect of the present invention, the systems, methods and computer program products described herein enable the control and recovery of connections in a multi-tasking multi-processor environment. In exemplary embodiments, the systems, methods and computer program products described herein implement an additional control connection, per channel, across which command and control messages can be sent.

Figure 1A:
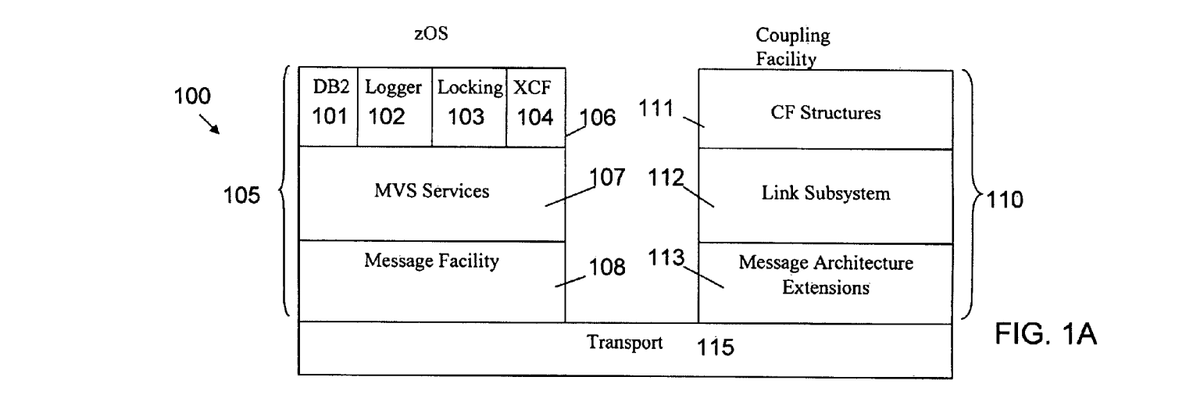
FIG. 1A illustrates an exemplary embodiment of a multi-tasking multi-processor Infiniband system.
Figure 1B:
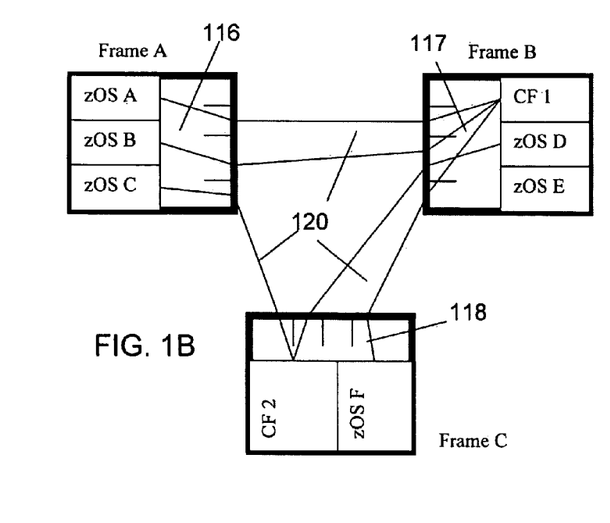
FIG. 1B illustrates an example of a multi-tasking multi-processor environment.
Figure 1C:
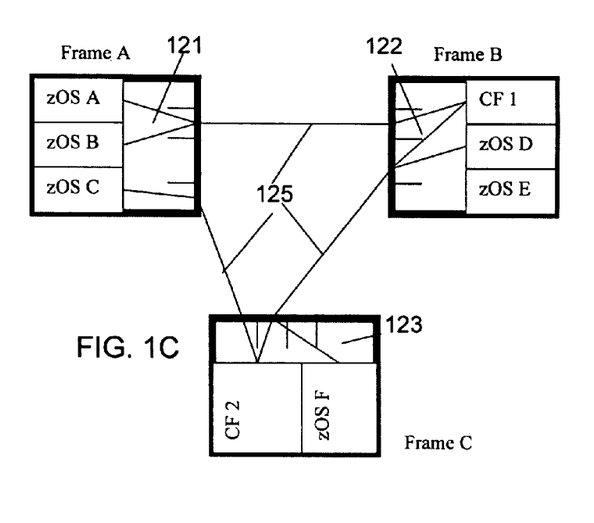
FIG. 1C illustrates an example of a multi-tasking multi-processor environment in accordance with an exemplary embodiment.
Figure 1D:
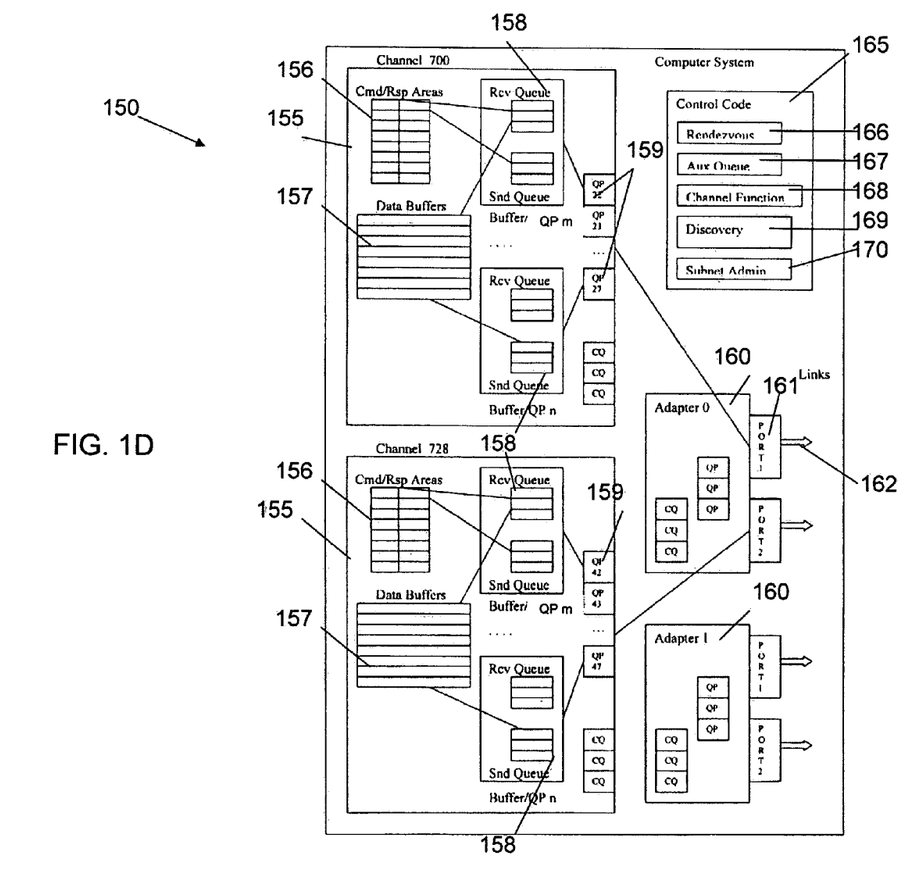
FIG. 1D illustrates an example of a multi-tasking multi-processor environment in accordance with an exemplary embodiment.

FIG. 1A illustrates an exemplary embodiment of a multi-tasking multi-processor Infiniband system 100. The system 100 can include an operating system 105 (e.g., IBM zOS) having a top layer including a relational database 101 a logging facility 102, a locking facility 103 and a cross system coupling facility (XCF). The operating system 105 can further include a multiple virtual storage (MVS) services layer 107 and a message facility layer 108. The system 100 can further include a coupling facility (CF) 110 having a CF structures layer 111, a link subsystem 112 and a message architecture extensions layer 113. In an exemplary embodiment, a transport layer 115 is disposed between and couples the operating system 105 and the CF 110. In an exemplary implementation, the transport layer 115 is supported by Infiniband. FIG. 1B illustrates an example of a multi-tasking multi-processor environment. The example shows three mainframes A, B, C connected into a two different Parallel Sysplex environments using the previous generation of coupling transports. zOS A, zOS B and zOS F are all tied together through a Coupling Facility (CF1). zOS C and zOS D are tied together through CF2. Meanwhile zOS E is a stand alone operating system. In this configuration separate channels are connected through separate adapters in the separate frames. It is appreciated that multiple internal channels 116, 117, 118 include separate external connections 120. FIG. 1C illustrates an example of a multi-tasking multi-processor environment in accordance with an exemplary embodiment. In this example, multiple internal channels 121, 122, 123 share the same physical connection 125. FIG. 1D illustrates an example of a multi-tasking multi-processor environment 150 in accordance with an exemplary embodiment. The environment 150 can include one or more channels 155, each channel including command/response areas 156, data buffers 157, receive/send queues 158 and adapters 160 for mapping the channels 155 to ports 161 and ultimately communication links 162, as discussed further herein. The channels 155 can further include queue pairs 159 as discussed further herein. The system 150 can further include control code 165 having functions including but not limited to: rendezvous 166, auxiliary queue 167, channel 168, discovery 169 and subnet administrator 170.

In an exemplary embodiment, a command and control connection can be established over a communications channel. The command and control connection can be implemented to: negotiate the number and sizes of the buffers; manage the establishment of the connections; exchange identification information; handle cancellation of individual operations; assure that the integrity of the channel is preserved; and manage disconnect and recovery of the link.

In an exemplary embodiment, the handling of the command and control connection is generic as compared to the coupling buffer communications connections, since messages can be sent at any time without concern about available receive resources. For example, sufficient resources are in place to handle cancellations for each buffer, heartbeat exchange, and channel recovery operations. In an exemplary embodiment, these resources can be going on in parallel across the same channel connection. Some of the complexity involved in this relates to managing all of these operations in a way that preserves the integrity of all data connections, whether they are on the channel of interest or on other channels running across the same physical link.

In an exemplary embodiment, each of the data connections is managed as a separate Infiniband queue pair. On the recipient side of the primary data connection queue pairs, all required work queue elements (e.g., two) are posted, one for the command and another for the data. The receipt of a third packet can cause the queue pair to go into error, thus preventing further communications across that queue pair. Therefore, the primary originator cannot use this connection to send a cancel message.

In an exemplary embodiment, the auxiliary queue pair can be implemented. A cancel message can be sent across the auxiliary queue pair at any time on behalf of any primary or secondary queue pair, since it maintains a set of receives resources sufficient to handle the maximum number of possible commands. Any request across the auxiliary queue pair can include sufficient information to correlate the request to a specific buffer and operation. The cancel message can specify the particular data queue pair to which the cancel operation is targeted. The cancel message could actually arrive before the recipient received the command and data that is being canceled.

In an exemplary embodiment, in order to isolate the existing multitasking multi-processor environment code from the specifics of this particular coupling technology implementation, the auxiliary queue pair code determines that the work queue elements that are posted on the originator side to receive the response are consumed, which means that the auxiliary queue pair code identifies the current state of processing on the recipient side, and if necessary, executes a portion of the function on behalf of the multitasking multi-processor environment code.

Figure 2:
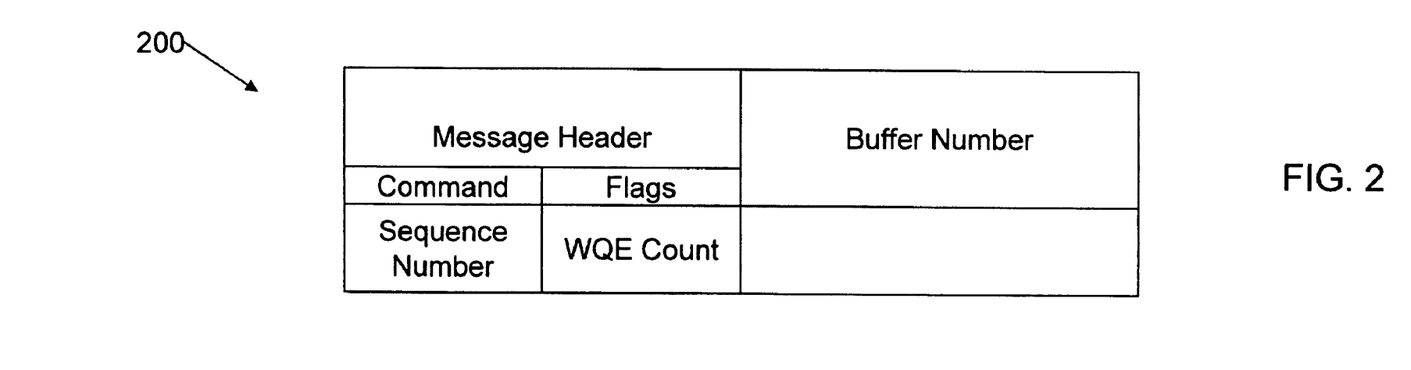
FIG. 2 illustrates an auxiliary message structure for buffer invalidate.

FIG. 2 illustrates an auxiliary message structure for buffer invalidate. This message includes four major components: the message header, the buffer number, the sequence number, and the WQE count. The message header is common to all messages sent and received in the exemplary embodiment, and consists of a command which denotes the type of message being exchanged, and flags which can specify options regarding the command. In the case of a buffer invalidate request, the command would indicate Invalidate, and the flags may indicate whether this is a request or a response message. The buffer number would specify the specific queue pair or data buffer which is being invalidated, and the sequence number will identify the specific operation on that buffer that is being invalidated. The WQE (work queue element) Count Field may be used on the invalidate request to indicate the number of receive WQEs that were prepared to receive the command response and data for the original command that is being invalidated. This can simplify the processing required on the recipient side of the link to ensure that the buffer is returned to its idle state so that it is ready to be used again.

Figure 3:
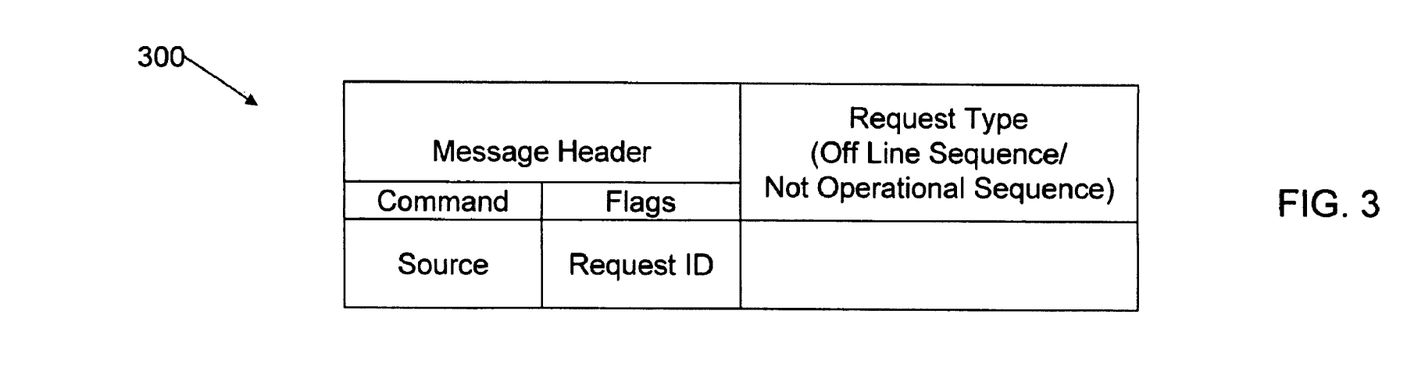
FIG. 3 illustrates auxiliary message structure for loss of link.

FIG. 3 illustrates the auxiliary message structure for loss of link. This message structure illustrates an exemplary embodiment of the message used for signaling loss of link which is sent on the out-of-band management connection. The message header component uses the same data structure as that for the buffer invalidate message, with the command indicating Loss of Link. The Request Type indicates whether or not the recipient is being requested to save data related to the state of the channel at the time of the receipt of the command. The source indicates which end of the channel initiated the request. Finally, the Request ID indicates the exact reason this request is being issued. The intent of the latter three fields is to ensure that there is sufficient information to properly handle the request, as well as to ensure that sufficient data is saved to assist in understanding what happened should this be needed for problem resolution.

In the case of the buffer invalidate or cancel operation, the systems and methods described herein are implemented under the following conditions: 1) Any buffer for which a cancel operation is begun cannot be released until both the command response and the buffer invalidate response are received and 2) All resources allocated at the transport level must be restored to the expected starting conditions before a new command may start. This condition includes both the send and receive resources for both the originator and recipient sides.

Figure 4A:
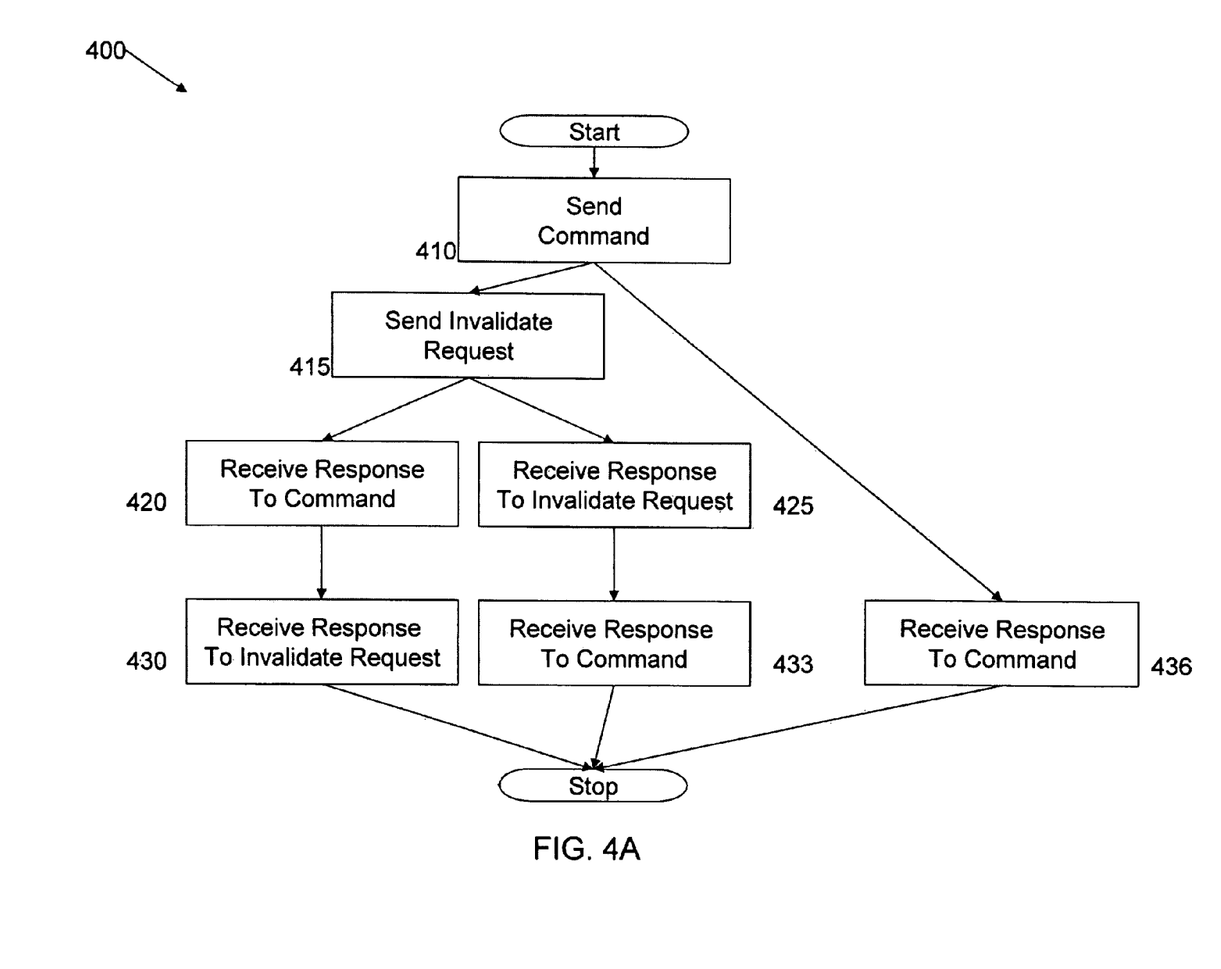
FIG. 4A illustrates a flow chart of a method for managing recovery and control of a communication link in a multi-tasking multi-processor environment from the originating or sending end.

FIG. 4A illustrates a flow chart of a method 400 for managing recovery and control of a communication link in a multi-tasking multi-processor environment from the send end perspective. At block 410, the data buffer queue pair sends a command. If there is no invalidate request to be processed. Then at block 436 the data buffer queue pair receives the response to the command. If an invalidate request is required, then at block 415, the management queue pair sends an invalidate request on behalf of the data buffer. Depending upon timing of the operations, either the response to the command will be received and processed at block 420, or the response to the invalidate request will be received and processed at block 425. If the response to the command arrives first, then the response to the invalidate request is still expected, and is processed at block 430 when it arrives. If the response to the invalidate request arrived first, then the response to the command is still expected, and will be processed at block 433 when it arrives.

Figure 4B:
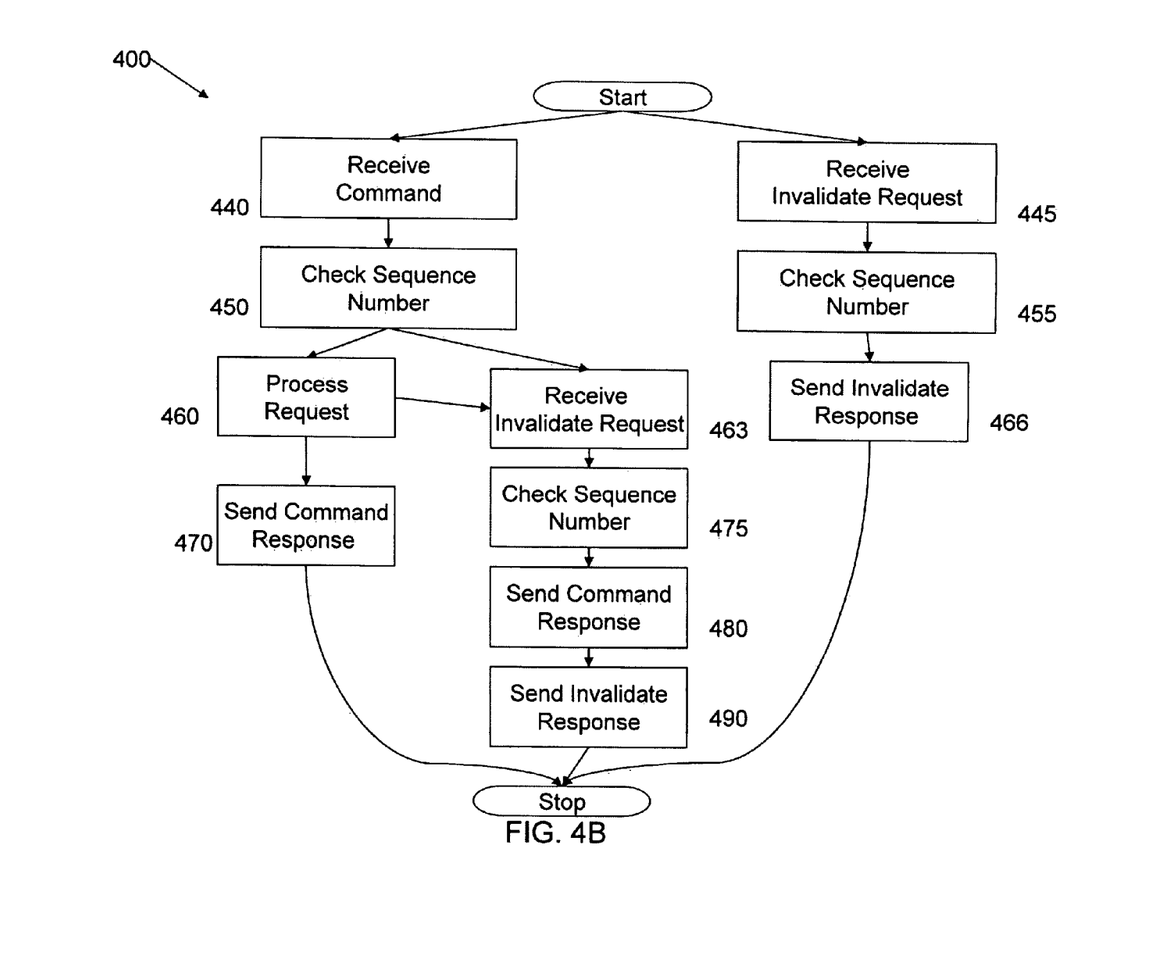
FIG. 4B illustrates a flow chart of a method for managing recovery and control of a communication link in a multi-tasking multi-processor environment from the receiving end.

FIG. 4B illustrates a flow chart of a method 400 for managing recovery and control of a communication link in a multi-tasking multi-processor environment from the receive end perspective. At block 440, the data buffer queue pair receives a command. At block 450, the data buffer queue pair checks a sequence number as now further described. From block 450, either the command will be processed at block 460 or the auxiliary queue pair receives an invalidate request at block 463. If the command is processed at block 460, then block 470 sends a command response. However, if the invalidate request is received, then block 475 will check the sequence number, after which block 480 will send a command response and block 490 sends an invalidate response. At block 445 the auxiliary queue pair receives an invalidate request when there is not a command pending. At block 455 the sequence number is checked, and then, if appropriate, block 466 sends an invalidate response.

In an exemplary embodiment, the buffer number field (e.g., see FIG. 2) in the message structure is used to indicate the specific buffer whose command is being canceled. It is appreciated that the invalidate request can actually arrive prior to the command, which is significantly more likely in a switched environment, but it can also happen in various error scenarios. It is also possible that the buffer invalidate request can arrive at the recipient after the processing of the command has completed. For these reasons, a sequence number is added to the request. As such, if the buffer invalidate request arrives prior to the command, the auxiliary queue pair is able to identify this case because the sequence number stored in the LCB (Link Control Block or data buffer management data structure) is not equal to the sequence number in the invalidate request. In this scenario, the auxiliary queue pair support saves the new sequence number into the LCB data structure and sends an invalidate buffer response message to the originator.

In the case that the buffer invalidate request arrives after the command processing has completed on the recipient side, the auxiliary queue pair support is able to detect this arrival because the sequence number in the invalidate request matches the number stored in the LCB data structure, and the current state indicator indicates that the buffer is ready for new work. As such, the auxiliary queue pair support sends an invalidate buffer response message to the originator without any further processing required, since the command processing has already processed the command and sent the command response.

In the other cases, the sequence number stored in the LCB data structure matches the number in the buffer invalidate request. However, the current state value indicates that the buffer is not ready for new work. In these cases, the auxiliary queue pair support works with the I/O Processor (IOP) to terminate the command processing and ensures that the needs of the originator are satisfied by ensuring that both the response to the command and the response to the invalidate request are sent, and the recipient side receive Work Queue Elements are prepared for receiving the next command.

In multi-tasking multi-processor environments, sending of a command involves sending two messages: a command message and a data message. The recipient side has a matching number of resources. Likewise, for the command response, there must be a matching number of resources between the sending and receiving sides. For response resources, the number of resources depends upon the command, but is known at the time that the command is sent. As such, when the command response is sent either under normal processing or in response to an invalidate request, all of the resources prepared at the time that the command was sent are accounted for in the command response.

Figure 5:
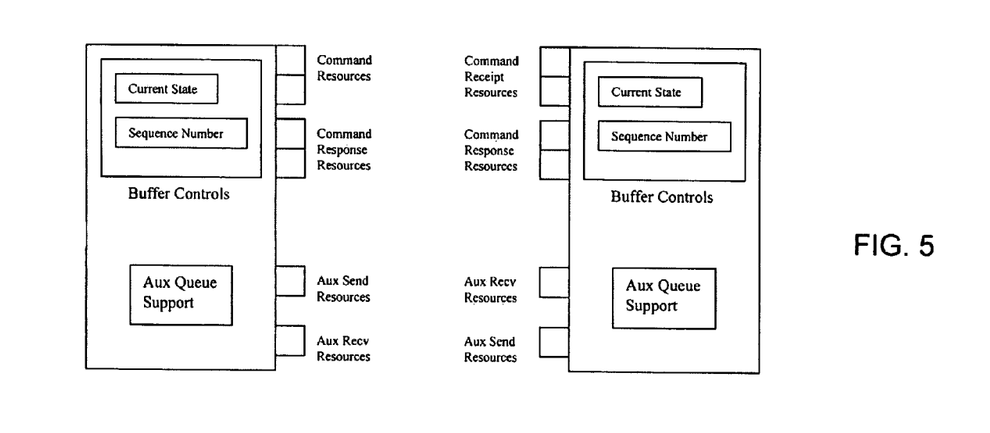
FIG. 5 illustrates sending and recipient ends in accordance with exemplary embodiments.

This concern is further illustrated in FIG. 5. Resources associated with the commands and responses are assigned either in anticipation of receiving a command or in anticipation of receiving a response. On the recipient side, command receipt resources are prepared both at queue pair initialization and then prior to sending a command response for a prior command. In this way these resources are always guaranteed to be ready to receive the next command for the queue pair. Prior to sending a command, the send side will prepare the resources for receiving the command response so that they are guaranteed to be ready. Only then will the send side actually send the command. On the recipient side, as previously mentioned, the processing of a command includes preparing the resources for the receipt of the next command prior to sending the command response for the current command. All of this illustrates the requirements for the auxiliary queue support when processing an invalidate request. The auxiliary queue support must insure that all resources on both sides of the link are in their expected state prior to allowing the command to be issued on the send side.

Figure 6:
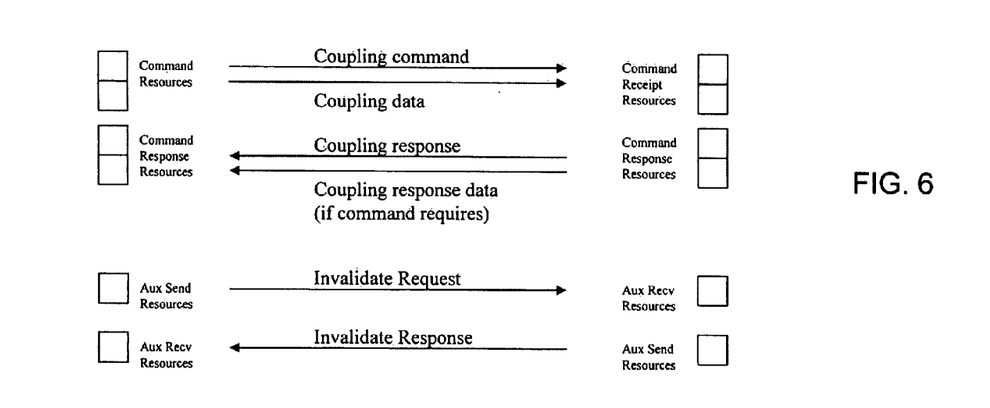
FIG. 6 illustrates a message exchange in accordance with exemplary embodiments.

Further illustration of the invalidate operation is shown in FIG. 6. This figure illustrates the messages that are exchanged across the link in order to achieve the desired results. Every coupling command sent is accompanied by a coupling data message, even if that message is of zero length, in order to match the receive side resource allocations for the command. The coupling response at a minimum is made up of the coupling response message, but may include additional response data messages. The response expectations are derived from the command that was sent, and the resources required to receive this response were prepared prior to the command being sent. Among the tasks assigned to the auxiliary queue support during invalidate requests is to act on behalf of the command recipient, unless it has already processed the command, to ensure that the original expectations of resources on the part of the sender of the command are fulfilled. This is the only way to ensure that the data buffer is prepared to advance to the next command.

Figure 7:
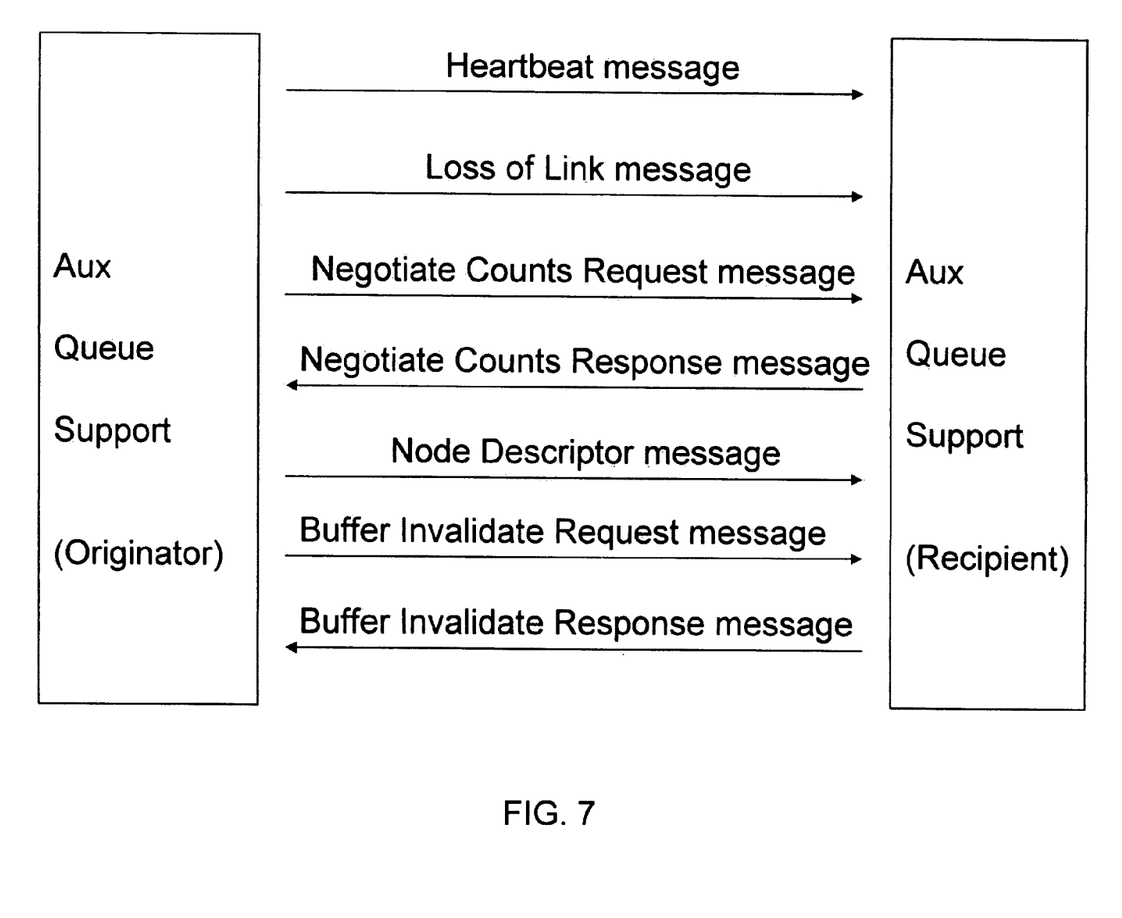
FIG. 7 illustrates a set of possible out-of-band signaling that may be exchanged in accordance with exemplary embodiments.

The invalidate request is by far the most complex of the commands currently managed by the auxiliary queue support. However, other out-of-band messages are frequently exchanged using the out-of-band signaling facility. FIG. 7 illustrates a set of messages in the exemplary embodiment. Either side of the link may generate heartbeat messages to inform the other side that the link is still viable. In addition, either side of the link may send a Loss of Link message to inform the other side that the link is being recycled due to some problem or action. The remainder of the messages that are included in the exemplary embodiment are related to establishing the channel. When auxiliary queue pairs are first connected, they exchange Negotiate Count messages (one request and one response) to determine the number and size of buffers that the channel will support. In addition, each side sends a Node Descriptor message which describes the local environment.

Technical effects of exemplary embodiments include the ability to resolve complex issues through the implementation of virtual out of band signaling on a virtual channel, and the components that were used to overcome the complexities associated with the situation.

Figure 8:
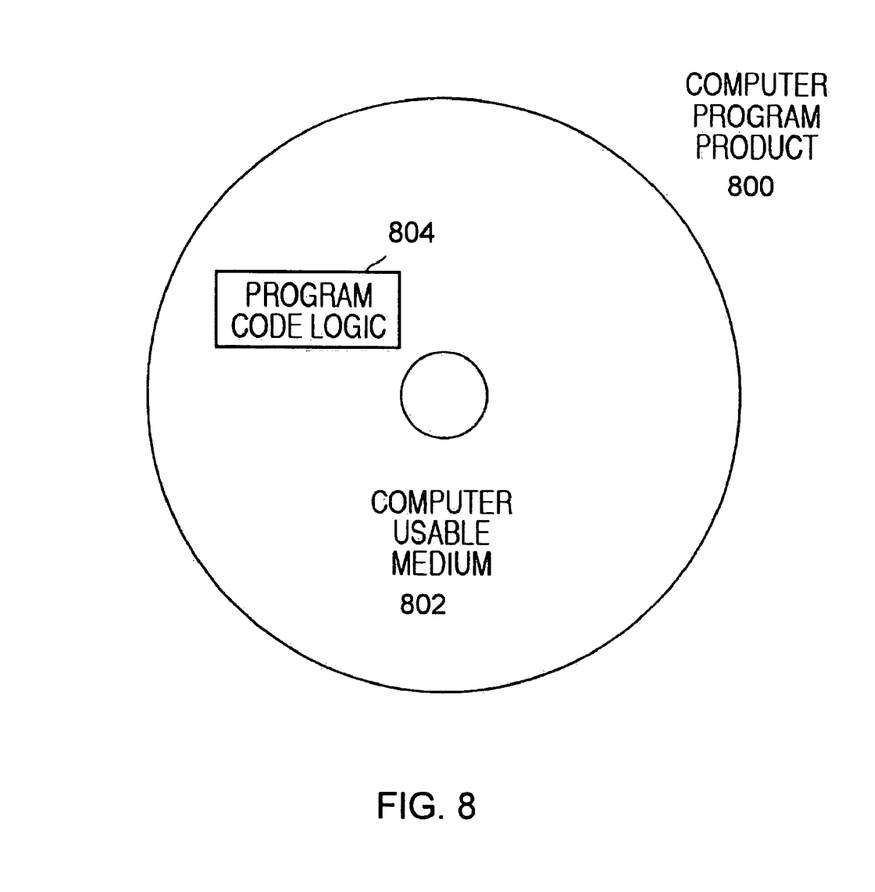
FIG. 8 depicts one embodiment of an article of manufacture incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 800 as depicted in FIG. 8 on a computer usable medium 802 with computer program code logic 804 containing instructions embodied in tangible media as an article of manufacture. Exemplary articles of manufacture for computer usable medium 802 may include floppy diskettes, CD-ROMs, hard drives, universal serial bus (USB) flash drives, or any other computer-readable storage medium, wherein, when the computer program code logic 804 is loaded into and executed by a computer, the computer becomes an apparatus for practicing the invention. Embodiments include computer program code logic 804, for example, whether stored in a storage medium, loaded into and/or executed by a computer, or transmitted over some transmission medium, such as over electrical wiring or cabling, through fiber optics, or via electromagnetic radiation, wherein, when the computer program code logic 804 is loaded into and executed by a computer, the computer becomes an apparatus for practicing the invention. When implemented on a general-purpose microprocessor, the computer program code logic 804 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for managing recovery and control of a communication link in a multi-tasking multi-processor environment, the computer program product comprising:
 a tangible storage medium readable by a processing circuit and storing instructions for execution by the processing circuit for performing a method comprising:
 preparing command receipt resources to process a first command response from a data buffer to which a command is sent to perform work, the data buffer having queue pairs;
 sending the first command to the queue pairs in the data buffer to perform work;
 sending an invalidate request to the data buffer associated with the first command;
 receiving a response to the invalidate request at least one of prior to the first command reaching the recipient and after the first command reaching the recipient; and
 releasing the command receipt resources in response to receiving a response to the first command and the response to the invalidate request in preparation of sending a second command.

2. The computer program product as claimed in claim 1 wherein the method further comprises in response to the invalidate request reaching a recipient prior to the first command reaching the recipient, receiving a response to the invalidate request in which a sequence number of the invalidate request mismatched a sequence value saved in a data structure.

3. The computer program product as claimed in claim 2 wherein the method further comprises saving the sequence number of the invalidate request into the data structure.

4. The computer program product as claimed in claim 3 wherein the method further comprises sending an invalidate buffer response message.

5. The computer program product as claimed in claim 1 wherein the method further comprises in response to the invalidate request reaching the recipient after the first command reaching the recipient, receiving a response to the invalidate request in which the sequence number of the invalidate request matched the sequence value saved in the data structure.

6. The computer program product as claimed in claim 5 wherein the method further comprises sending an invalidate buffer response message.

7. The computer program product as claimed in claim 1 wherein the method further comprises receiving a response to the invalidate request in which the sequence number of the invalidate request matched the sequence value saved in the data structure.

8. The computer program product as claimed in claim 7 wherein the method further comprises determining that a buffer is ready for work.

9. The computer program product as claimed in claim 8 wherein the method further comprises terminating first command processing in response to the buffer being not ready to receive work.

10. An apparatus for managing recovery and control of a communication link in a multi-tasking multi-processor environment, the apparatus comprising:
 a processor configured to
 prepare command receipt resources to process a first command response from a data buffer to which a command is sent to perform work, the data buffer having queue pairs;

the first command to the queue pairs in the data buffer to perform work;

send an invalidate request to the data buffer associated with the first command;

receive a response to the invalidate request at least one of prior to the first command reaching the recipient and after the first command reaching the recipient;

in response to the invalidate request reaching a recipient prior to the first command reaching the recipient, receive a response to the invalidate request in which a sequence number of the invalidate request mismatched a sequence value saved in a data structure;

in response to the invalidate request reaching the recipient after the first command reaching the recipient, receive a response to the invalidate request in which the sequence number of the invalidate request matched the sequence value saved in the data structure; and release the command receipt resources in response to receiving a response to the first command and the response to the invalidate request in preparation of sending a second command.

11. The apparatus as claimed in claim 10 wherein the processor is further configured to determine that the data buffer is ready for work; and terminate a first command processing in response to the data buffer being not ready to receive work.

12. A method for managing recovery and control of a communication link in a multi-tasking multi-processor environment, the method comprising:

preparing command receipt resources to process a first command response from a data buffer to which a command is sent to perform work, the data buffer having queue pairs;

sending the first command to the queue pairs in the data buffer to perform work;

sending an invalidate request to the data buffer associated with the first command;

receiving a response to the invalidate request at least one of prior to the first command reaching the recipient and after the first command reaching the recipient; and releasing the command receipt resources in response to receiving a response to the first command and the response to the invalidate request in preparation of sending a second command.

13. The method as claimed in claim 12 wherein the method further comprises in response to the invalidate request reaching a recipient prior to the first command reaching the recipient, receiving a response to the invalidate request in which a sequence number of the invalidate request mismatched a sequence value saved in a data structure.

14. The method as claimed in claim 13 further comprising saving the sequence number of the invalidate request into the data structure.

15. The method as claimed in claim 14 further comprising sending an invalidate buffer response message.

16. The method as claimed in claim 12 further comprising in response to the invalidate request reaching the recipient after the first command reaching the recipient, receiving a response to the invalidate request in which the sequence number of the invalidate request matched the sequence value saved in the data structure.

17. The method as claimed in claim 16 further comprising sending an invalidate buffer response message.

18. The method as claimed in claim 12 further comprising receiving a response to the invalidate request in which the sequence number of the invalidate request matched the sequence value saved in the data structure.

19. The method as claimed in claim 18 further comprising determining that a buffer is ready for work.

20. The method as claimed in claim 19 further comprising terminating the first command processing in response to the buffer being not ready to receive work.

* * * * *